(12) United States Patent
Miklo

(10) Patent No.: US 6,253,791 B1
(45) Date of Patent: Jul. 3, 2001

(54) BALL VALVE

(75) Inventor: Jurgen Miklo, Thayngen (CH)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 0 days.

(21) Appl. No.: 09/411,675

(22) Filed: Oct. 7, 1999

(30) Foreign Application Priority Data

Oct. 7, 1998 (DE) .............................. 198 46 084

(51) Int. Cl.[7] ................................................. F16K 11/087
(52) U.S. Cl. ................ 137/876; 137/625.47; 251/315.14
(58) Field of Search ....................... 251/315.13, 315.14, 251/876, 625.47, 315.08

(56) References Cited

U.S. PATENT DOCUMENTS

| 2,734,715 | * | 2/1956 | Knox | 251/315.14 |
| 3,016,062 | * | 1/1962 | Zinniger | 251/315.14 |
| 3,112,758 | * | 12/1963 | Norton | 251/315.14 |
| 3,206,164 | * | 9/1965 | Yopp | 251/315.14 |
| 4,061,307 | * | 12/1977 | Yoshiike et al. | 251/315.08 |
| 4,103,868 | * | 8/1978 | Thompson | 251/283 |
| 4,572,239 | * | 2/1986 | Koch et al. | 137/625.47 |

FOREIGN PATENT DOCUMENTS 4436202  11/1996 (DE) .

* cited by examiner

*Primary Examiner*—John Fox
(74) *Attorney, Agent, or Firm*—Bachman & LaPointe, P.C.

(57) ABSTRACT

A ball valve is provided with a one-piece housing, in which a ball is accommodated such that it can rotate. In addition to an upper bearing point, the ball valve has a lower bearing point, which is located diametrically opposite the first. The ball and the housing are matched to each other in such a way that the ball can be inserted into the housing from the outside via a fluid opening. In order to fix the ball inserted into the housing, provision is made for screw-in elements which have a spherical seal on the front side.

8 Claims, 3 Drawing Sheets

Section A-A

BALL VALVE

BACKGROUND OF THE INVENTION

The invention relates to a ball valve comprising a one piece housing opposed bearing points for supporting a ball which is inserted into the housing from outside thereof.

In the case of ball valves of the generic type provided with a one-piece housing, the ball is inserted into the housing via a fluid opening. In order to be able to rotate the ball accommodated in the housing, which can be equated with the operation of the ball valve, in the normal case a pin is provided which is connected to the ball in a force-fitting and/or positive manner, is led to the outside through the wall of the housing and is provided with an operating lever at the end. The pin connected to the ball simultaneously acts as a bearing pin which supports the ball on one side. In order to seal off the ball with respect to the fluid openings (inlets and outlets) of the ball valve, provision is made for screw-in elements of the hollow cylindrical design, whose end faces are provided with annular spherical seals. These screw-in elements are screwed into internal threads in the fluid openings, so that the spherical seals rest snugly on the ball. The disadvantage with ball valves designed this way is that the seals also have to absorb lateral forces from the ball, since the ball has the tendency to escape laterally when the fluid openings are closed, as a result of the prevailing fluid pressure. Since the ball is mounted only on one side and the spherical seals, because of their principle, have to be resilient, these lateral forces cause lateral movements of the ball, which may lead to leaks in the valve. In addition, such seals are subject to excessively high wear. Moreover, ball valves of this type are suitable only for comparatively low fluid pressures.

It is therefore an object of the present invention to improve a ball valve of the type described above in such a way that the ball valve effects reliable sealing with long-term stability and, moreover, is simple and cost-effective to produce.

SUMMARY OF THE INVENTION

The foregoing object is achieved by the present invention wherein a ball valve is provided with a one-piece housing in which a ball is accommodated such that it can rotate. In addition to an upper bearing point, the ball valve has a lower bearing point, which is located diametrically opposite the first. The ball and the housing are matched to each other in such a way that the ball can be inserted into the housing from the outside via a fluid opening. In order to fix the ball inserted into the housing, provision is made for screw-in elements which have a spherical seal on the front side.

The ball valve of the embodiment described above is provided with a second bearing for the ball, by means of which lateral movements of the ball can largely be prevented, with the intention that the ball can still be inserted into the housing from the outside in a simple way.

Further features of the invention are described in the following detailed description.

BRIEF DESCRIPTION OF THE DRAWINGS

A preferred exemplary embodiment of the invention will be described in more detail below with reference to drawings, in which.

DETAILED DESCRIPTION

Since the fundamental configuration of ball valves of this type is known, only the features which are relevant in connection with the present invention will be discussed below.

Figure 1:
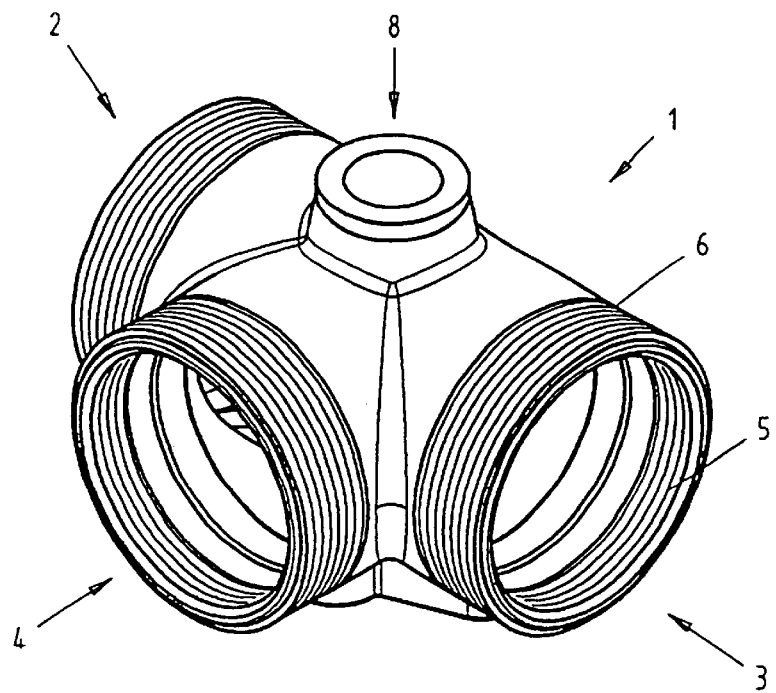
FIG. 1 shows a perspective external view of the housing.

FIG. 1 shows, in a perspective illustration, an external view of a T-shaped housing 1 for a 3-way ball valve. The housing 1 is designed in one piece and has three fluid openings 2, 3, 4, which are each provided with an internal thread 5 and an external thread 6. Two of these fluid openings 2, 3 are arranged coaxially with one another, while the third fluid opening 4 runs at right angles thereto. Moreover, the housing 1 is provided with a vertical drilled hole 8 to accommodate a pin, as will be explained in more detail next.

Figure 2:
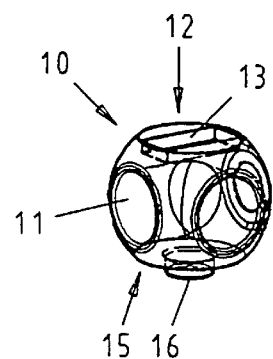
FIG. 2 shows a perspective view of the ball.

In FIG. 2, the ball 10 to be inserted into the housing according to FIG. 1 is illustrated in a perspective view. The ball 10 has an L-shaped fluid bore 11. On the upper side and the underside, the ball 10 is provided with flats 12, 15. A rectangular recess 13 has been made in the upper flat 12, while a bearing element 16 protrudes from the lower flat 15.

Figure 3:
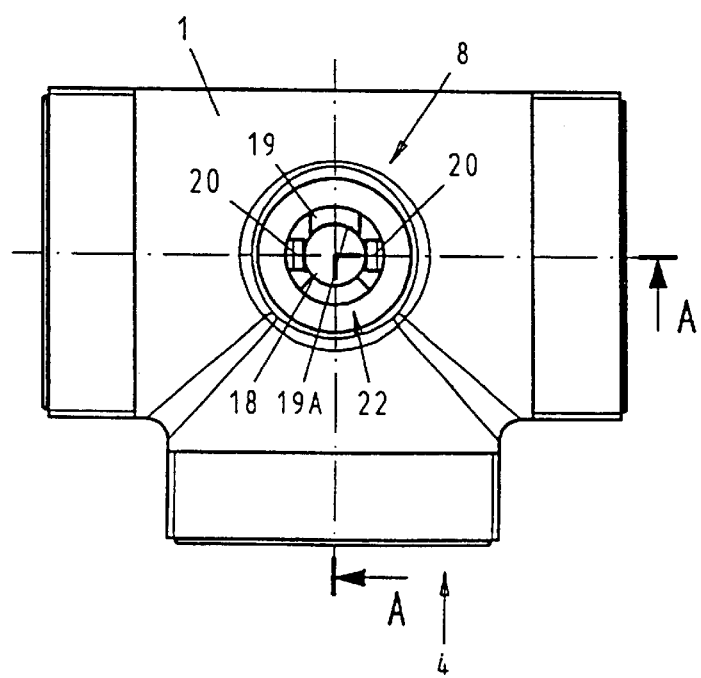
FIG. 3 shows the housing in a view from above.
Figure 4:
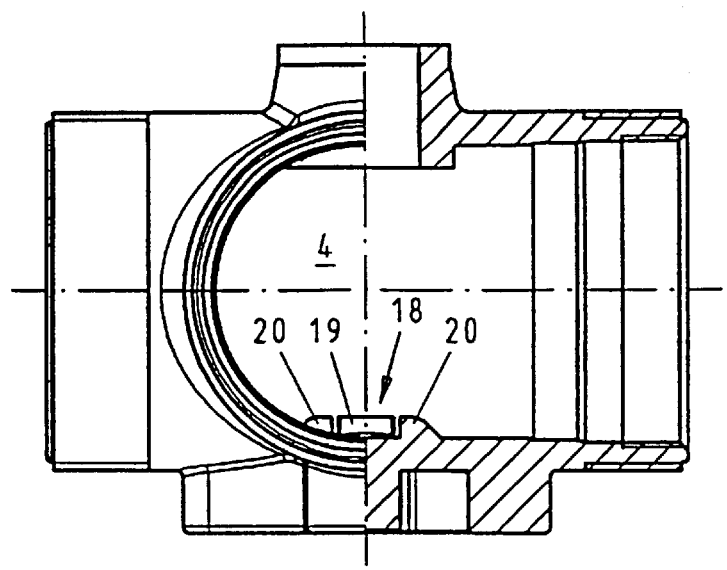
FIG. 4 shows a partial section along the line A—A in FIG. 3.

FIG. 3 shows the housing 1 in a view from above, and FIG. 4 shows said housing in a section along the line A—A in FIG. 3. These two figures reveal a guide, designed as a recess 18, which serves to accommodate the bearing element 16 and, together with the latter, forms a lower bearing point for the ball. This recess 18 is bounded by three webs 19, 20 formed in one piece with the housing 1. The central web 19 has a concave end face 19A, whose radius corresponds to the radius of the bearing element of the ball. In the present case, the housing 1 is constructed in such a way that the ball can be inserted into the housing 1 via the third fluid opening 4. In order to be able to insert the bearing element 16 of the ball 10 (FIG. 2) into the recess 18, the recess 18 has an opening 22 which is aligned with the third fluid opening 4.

Figure 5:
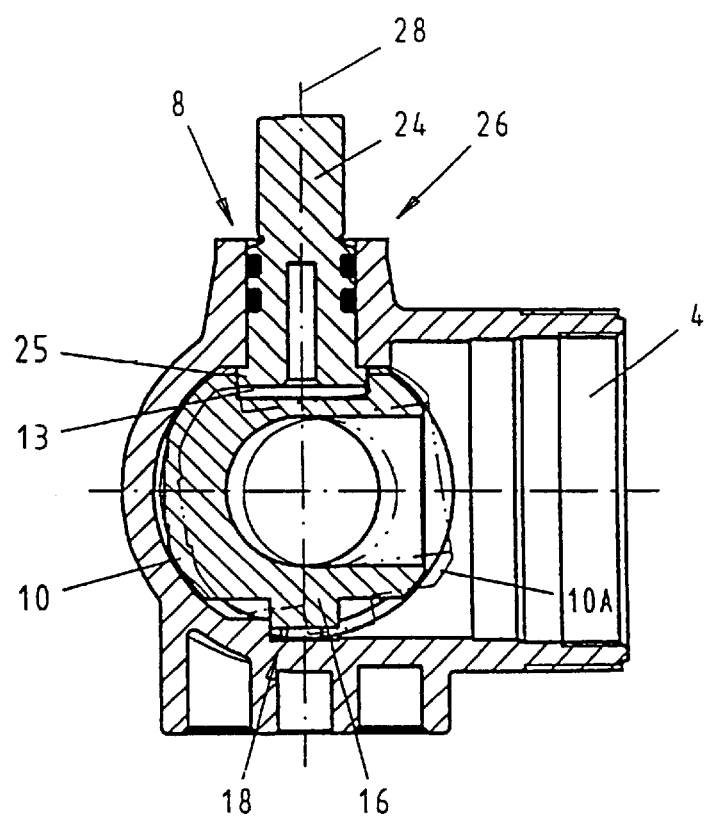
FIG. 5 shows a cross section through the housing and the ball as the latter is inserted into the housing.

The insertion of the ball 10 into the housing 1 will be explained in more detail with reference to FIG. 5. Before the ball 10 is inserted into the housing 1, a pin 24 is inserted into the drilled hole 8 from the inside of the housing. The pin 24 has an end part 25 which serves as a stop collar and whose shape corresponds to the recess 13 on the upper side of the ball 10. Following the insertion of the pin 24, the ball 10 can be inserted into the housing 1 via the third fluid opening 4, and the guide element 16 can be inserted into the recess 18 via the opening. In order that the end part 25 of the pin 24 can be accommodated in the recess 13 in the ball 1, the ball 1 is set slightly obliquely as it is being inserted into the housing 1, which is indicated by a ball 10A drawn with broken lines. The pin 24 supported in the drilled hole 8 in the housing 1 thus forms an upper bearing point 26. The axis of rotation of the ball 10 is shown with the reference numeral 28. The two bearing points 26, 27 are arranged on mutually diametrically opposite sides of the ball 10. In order to rotate the pin 24, an operating lever (not shown) is provided, which is plugged onto the end of the pin 24.

Figure 6:
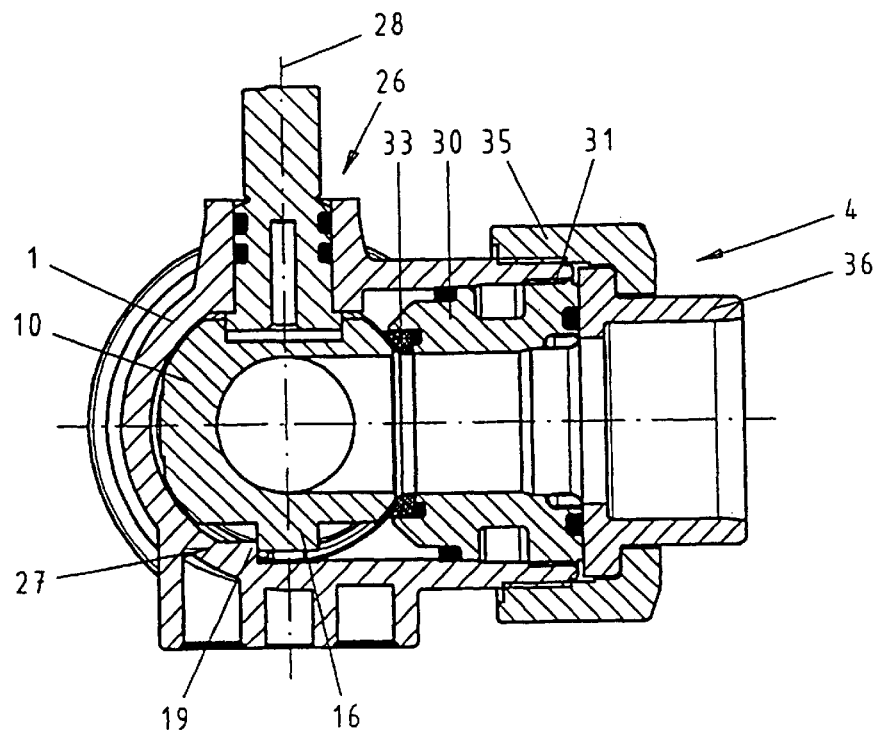
FIG. 6 shows a cross section through the assembled ball valve.

FIG. 6 shows a cross section through the assembled ball valve. In order to fix the ball 10 in the final position, provision is made for a hollow cylindrical screw-in part 30, which is provided with an external thread 31. This screw-in part 30 is provided with a spherical seal 33 at the front end, by means of which seal the ball 10 is sealed with respect to the housing 1 and, respectively, the fluid openings. The screw-in part 30 is tightened with a predetermined force, so that the spherical seal 33 rests snugly on the ball 10. After the ball 10 has been inserted into the housing 1, the screw-in part 30 is screwed into the third fluid opening 4, as a result of which the bearing element 16 of the ball 10 rests on the central web 19 bounding the recess at the rear, and fixes the ball 10 in the recess. After that, corresponding screw-in parts can likewise be screwed into the two other fluid openings. Since screw-in elements are provided in any case in ball valves of the generic type, the ball can be fixed in a simple way by means of a screw-in element. A union nut 35, which fixes a connecting flange 36 can be screwed onto the external thread of the fluid opening 4. The operating torque of the ball valve van be determined or changed on the basis of the tightening torque of the screw-in part 30.

In relation to the design of the lower bearing point, in the present embodiment, care has been taken to ensure that the guide 18 can absorb the lateral forces occurring during operation. The lateral forces acting on the ball 10 are brought about by the prevailing fluid pressure when the fluid openings are closed. The guide 18 and the bearing element 16 of the ball 10 act together in such a way that the ball 10 is supported in relation to the possible lateral forces. Since hardly any lateral forces act on the ball 10 in the direction of the third fluid opening 4, the opening 22 of the recess 18 is aligned with the third fluid opening 4 (FIG. 3).

Instead of being fixed by screw-in parts, the ball could also be fixed in the housing by resilient elements. For example, the bearing element could be supported resiliently on the ball in the direction of the axis of rotation 28. Another variant consists in the recess being bounded at the front by a resilient web. In both cases, the ball would be fixed following its intersection into the housing, so that the screw-in elements would only have to undertake the actual sealing function.

Figure 7:
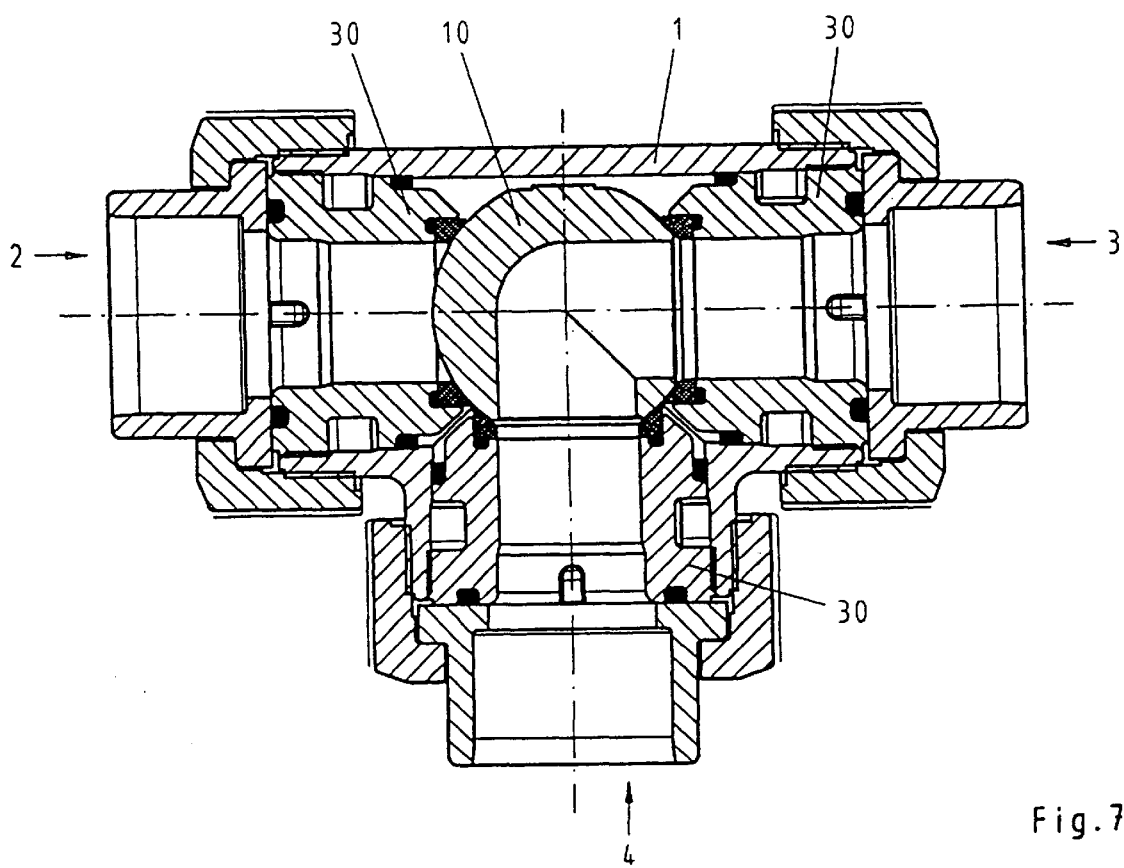
FIG. 7 shows a horizontal longitudinal section through the assembled ball valve.

The finally assembled ball valve can be seen from FIG. 7 in a horizontal longitudinal section. In this illustration, one of five possible operating positions of the ball 10 is shown. Moreover, it is evident that a respective screw-in element 30 is accommodated in all three fluid openings 2, 3, 4.

It should be added that, within the scope of the area of protection defined in the patent claims, configurations of a ball valve which differ from the preceding exemplary embodiment are entirely possible. For example, the opening provided for the insertion of the bearing element into the recess could be left out, so that the bearing element is guided on all sides. For this purpose, the bearing element could be supported resiliently on the ball in the direction of the axis of rotation of the latter. In this case, the ball is already fixed following its insertion into the housing, and does not need to be secured additionally.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A ball valve comprising a housing having three fluid openings, two of the fluid openings being arranged coaxially with one another and the third fluid opening being arranged substantially at a right angle to the two fluid openings, a ball rotatable about a longitudinal axis A and accommodated in the housing on a pair of diametrically opposed first and second bearing points which lie on the longitudinal axis A wherein the ball is sized with respect to at least the third fluid opening such that the ball is inserted into the housing from the outside thereof through the third fluid opening between the diametrically opposed first and second bearing points, and means for rotatably mounting the inserted ball in said housing which comprises said diametrically opposed bearing points which substantially eliminate lateral movement of the ball within the housing while allowing for rotational movement, wherein the second bearing point comprises a bearing element and a corresponding guide, the bearing element being arranged on the ball and the guide being arranged on the housing, the guide comprises a recess provided with an opening by which the bearing element can be inserted into the recess wherein the opening provided for the insertion of the bearing element is aligned with the third fluid opening.

2. The ball valve as claimed in claim 1, wherein the ball is provided with a recess into which a pin serving as a bearing pin for the first bearing point can be inserted.

3. The ball valve as claimed in claim 2, wherein the housing has a hole to receive the pin, the pin having an extension whose shape corresponds to the recess in the ball, wherein the pin is inserted into the hole from outside of the housing, and the extension of the pin is inserted into the recess of the ball after the ball is inserted into the housing.

4. The ball valve as claimed in claim 3, wherein the extension is substantially shaped so as to connect the pin to the ball in a positive and force-fitting manner.

5. The ball valve as claimed in claim 2, wherein the ball is provided with a flat on the upper side in which the recess is provided to accommodate the pin is made.

6. The ball valve as claimed in claim 1, wherein the ball is provided with a flat on the underside from which the bearing element protrudes.

7. The ball valve as claimed in claim 1, wherein the three fluid openings in the housing are each provided with an internal thread, and wherein a screw-in element which can be screwed into the internal thread for further eliminating lateral movement of the ball.

8. The ball valve as claimed in claim 7, wherein a seal is arranged between the screw-in element and the ball.

* * * * *